(12) United States Patent
Spengler et al.

(10) Patent No.: US 7,661,005 B2
(45) Date of Patent: Feb. 9, 2010

(54) INDIVIDUAL STORAGE DEVICE POWER CONTROL IN A MULTI-DEVICE ARRAY

(75) Inventors: David Louis Spengler, Colorado Springs, CO (US); Thomas M. Lawlor, Colorado Springs, CO (US); David P. DeCenzo, Pueblo, CO (US); Bill A. Pagano, Colorado Springs, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 453 days.

(21) Appl. No.: 11/479,364

(22) Filed: Jun. 30, 2006

(65) Prior Publication Data

US 2008/0005595 A1 Jan. 3, 2008

(51) Int. Cl.
G06F 1/26 (2006.01)

(52) U.S. Cl. .................... 713/330; 713/323; 365/226

(58) Field of Classification Search ............... 713/300, 713/323, 330; 365/226
See application file for complete search history.

(56) References Cited

U.S. PATENT DOCUMENTS

| | | | |
|---|---|---|---|
| 5,587,685 A | 12/1996 | Johansson | |
| 5,666,538 A | 9/1997 | DeNicola | |
| 5,961,613 A | 10/1999 | DeNicola | |
| 6,625,690 B2 * | 9/2003 | Kamo et al. | 711/114 |
| 6,868,501 B2 * | 3/2005 | Saitou et al. | 713/330 |
| 7,035,972 B2 | 4/2006 | Guha et al. | |
| 7,305,572 B1 * | 12/2007 | Burroughs et al. | 713/300 |
| 7,370,220 B1 * | 5/2008 | Nguyen et al. | 713/330 |
| 2002/0188711 A1 | 12/2002 | Meyer et al. | |
| 2003/0031187 A1 | 2/2003 | Heffernan et al. | |
| 2007/0226523 A1 * | 9/2007 | Chang | 713/300 |

* cited by examiner

*Primary Examiner*—Thuan N Du
(74) *Attorney, Agent, or Firm*—Fellers, Snider, et al.

(57) ABSTRACT

Method and apparatus for controllably applying input power to storage devices in a multi-device array. The array preferably includes a circuit which changes input power state of the storage devices in a time-staggered sequence. Preferably, the change of input power state transitions the array from an operationally deactivated state to an operationally activated state, or vice versa. The storage devices preferably store data in accordance with a selected RAID configuration. A power supply preferably supplies respective first and second direct current (dc) voltages to each of the storage devices, and the circuit respectively connects the dc voltages to the storage devices in a selected sequential order. The circuit further preferably changes an input power state of a single storage device of the array in accordance with a selected time-varying profile. The profile is preferably applied to a gate of a switching device to control a source-drain conduction path.

20 Claims, 5 Drawing Sheets

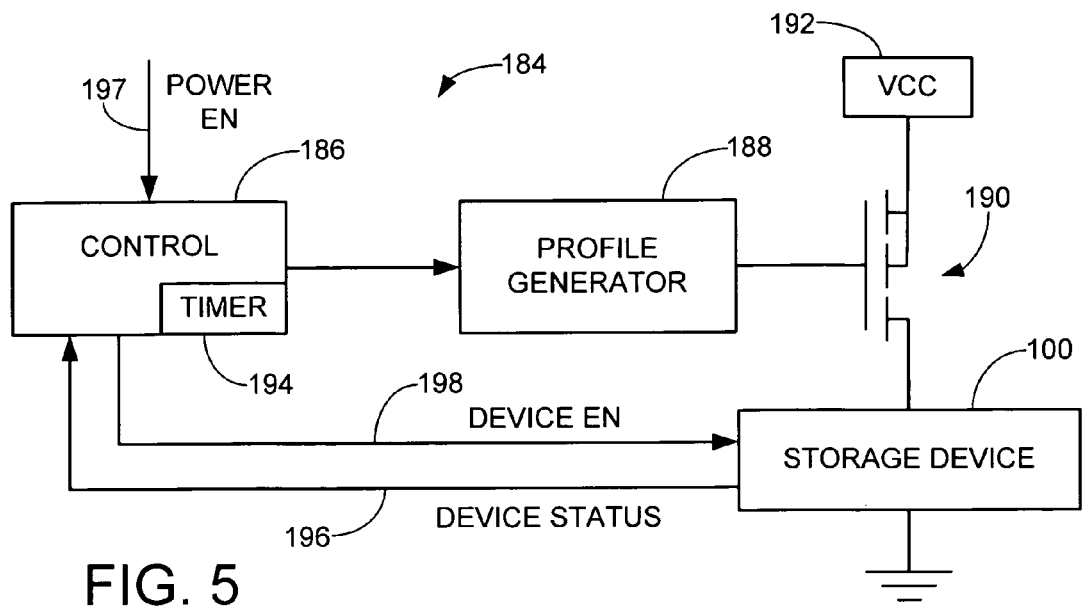
FIG. 5
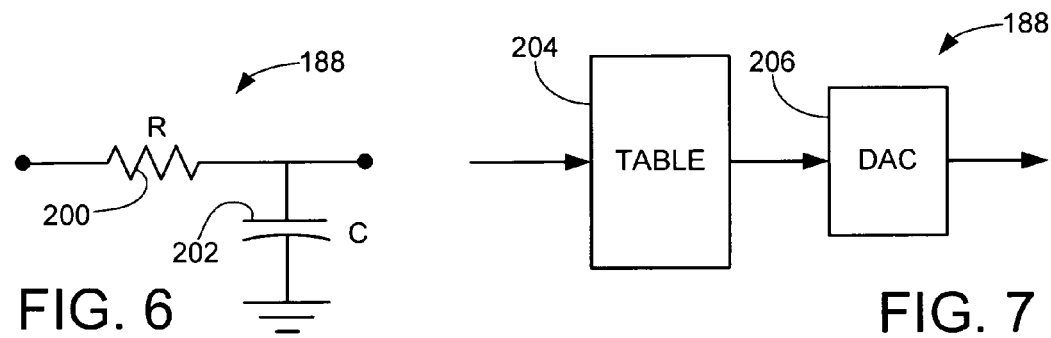
FIG. 6
FIG. 7
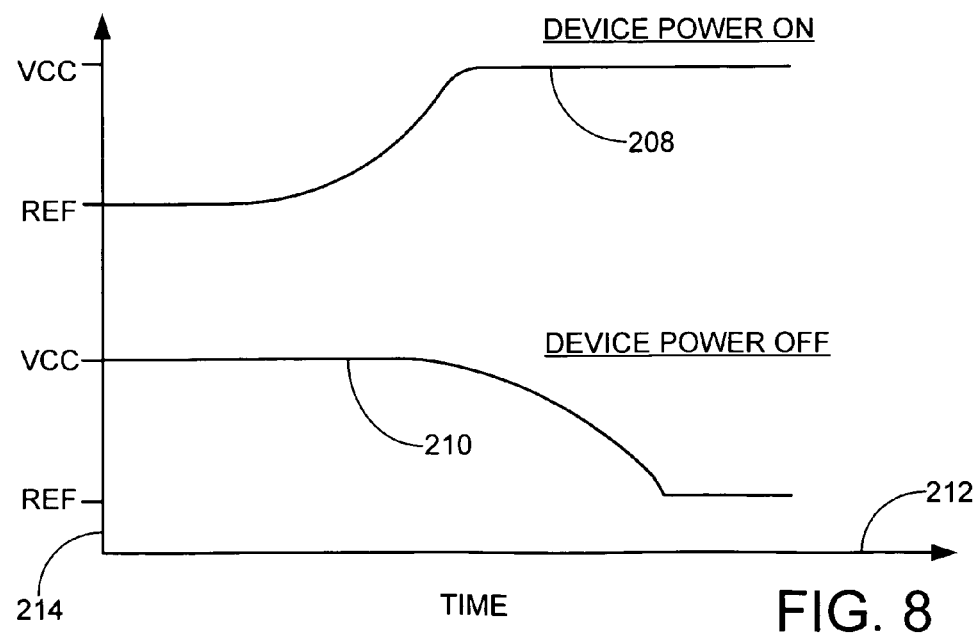
FIG. 8

INDIVIDUAL STORAGE DEVICE POWER CONTROL IN A MULTI-DEVICE ARRAY

FIELD OF THE INVENTION

The claimed invention relates generally to the field of data storage systems and more particularly, but not by way of limitation, to a method and apparatus for controlling the input power state of individual devices in a multi-device array.

BACKGROUND

Storage devices are used to access data in a fast and efficient manner. Some types of storage devices use rotatable storage media, along with one or more data transducers that write data to and subsequently read data from tracks defined on the media surfaces.

Multi-device arrays (MDAs) can employ multiple storage devices to form a consolidated memory space. One commonly employed format for an MDA utilizes a RAID (redundant array of independent discs) configuration, wherein input data are stored across multiple storage devices in the array. Depending on the RAID level, various techniques including mirroring, striping and parity code generation can be employed to enhance the integrity of the stored data.

With continued demands for ever increased levels of storage capacity and performance, there remains an ongoing need for improvements in the manner in which storage devices in such arrays are operationally managed. It is to these and other improvements that preferred embodiments of the present invention are generally directed.

SUMMARY OF THE INVENTION

Preferred embodiments of the present invention are generally directed to an apparatus and method for controlling the input power state of individual storage devices in a multi-device array.

The array preferably includes a circuit which changes the input power state of the storage devices in a time-staggered sequence. The change of input power state preferably transitions the array between an operationally deactivated state and an operationally activated state (i.e., powers-up or powers-down the array, as desired). The storage devices preferably store data in accordance with a selected RAID configuration.

A power supply preferably supplies respective first and second direct current (dc) voltages to each of the storage devices, and the circuit respectively connects the dc voltages to the storage devices in a selected sequential order.

The circuit further preferably changes the input power state of at least one storage device of the array in accordance with a selected time-varying profile. The profile is preferably applied to a gate of a switching device to control a source-drain conduction path.

These and various other features and advantages which characterize the claimed invention will become apparent upon reading the following detailed description and upon reviewing the associated drawings.

BRIEF DESCRIPTION OF THE DRAWINGS

FIG. 5 sets forth relevant portions of a power management block of FIG. 4.

FIG. 6 provides one preferred implementation of a profile generator block of FIG. 5 that incorporates an RC circuit.

FIG. 7 provides another preferred implementation of the profile generator block of FIG. 5 that incorporates a profile table.

FIG. 8 shows respective input power state transition curves resulting from operation of the circuitry of FIGS. 5-7.

DETAILED DESCRIPTION

Figure 1:
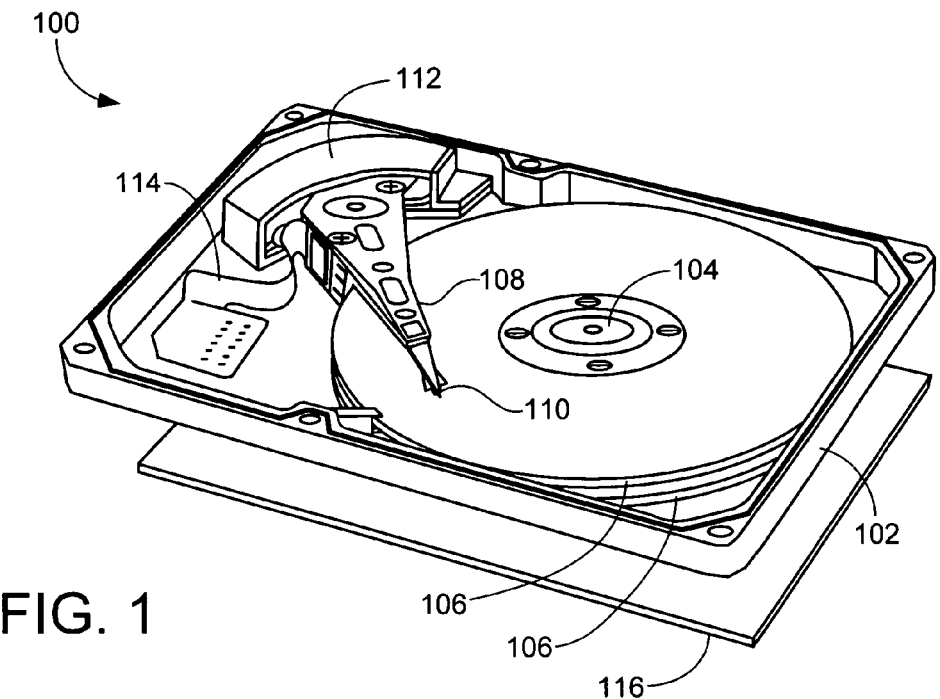
FIG. 1 generally illustrates a storage device constructed and operated in accordance with preferred embodiments of the present invention.

FIG. 1 shows an exemplary storage device 100 configured to store and retrieve user data. The device 100 is preferably characterized as a hard disc drive, although other device configurations can be readily employed as desired.

A base deck 102 mates with a top cover (not shown) to form an enclosed housing. A spindle motor 104 is mounted within the housing to controllably rotate media 106, preferably characterized as magnetic recording discs.

A controllably moveable actuator 108 moves an array of read/write transducers 110 adjacent tracks defined on the media surfaces through application of current to a voice coil motor (VCM) 112. A flex circuit assembly 114 provides electrical communication paths between the actuator 108 and device control electronics on an externally mounted printed circuit board (PCB) 116.

Figure 2:
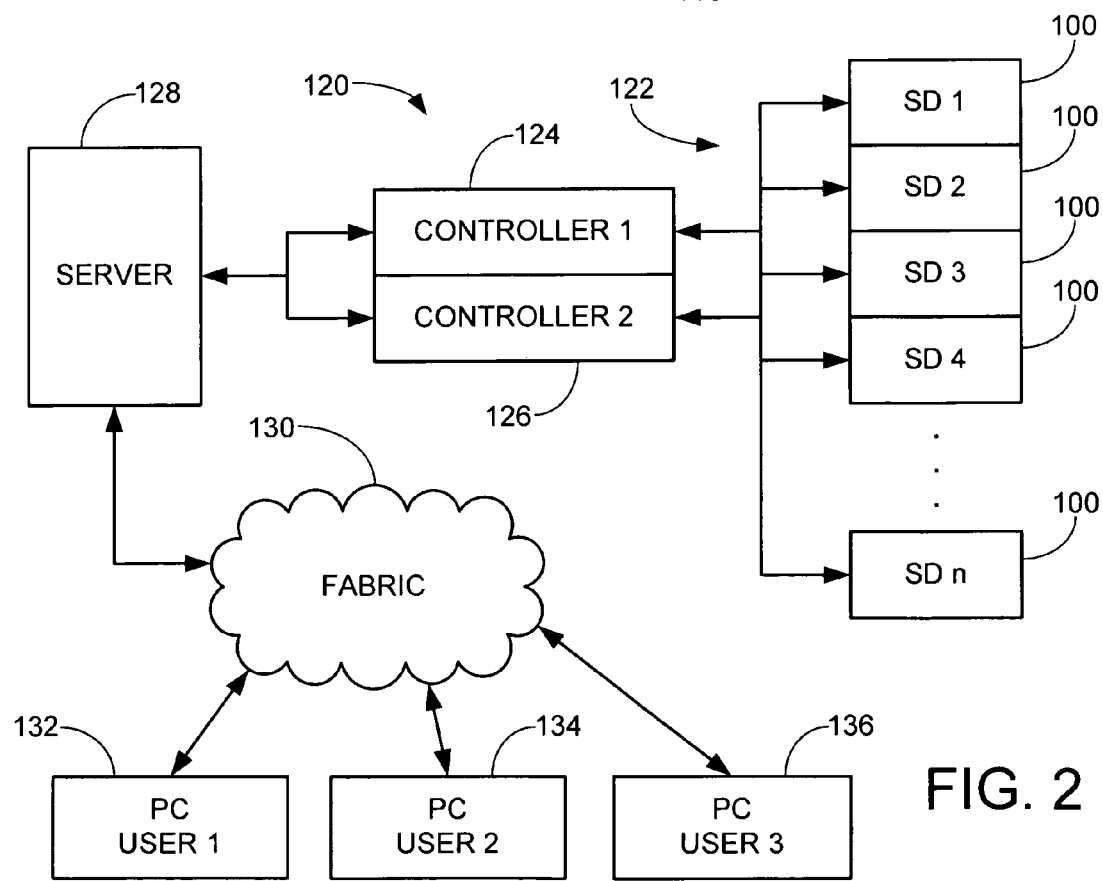
FIG. 2 is a functional block diagram of a network system which utilizes a number of storage devices such as illustrated in FIG. 1.

FIG. 2 generally illustrates an exemplary network system 120 that advantageously incorporates a number n of the storage devices (SD) 100 to form a consolidated storage space 122. Redundant controllers 124, 126 preferably operate to transfer data between the storage space 122 and a server 128. The server 128 in turn is connected to a fabric 130, such as a local area network (LAN), the Internet, etc.

Remote users respectively access the fabric 130 via personal computers (PCs) 132, 134, 136. In this way, a selected user can access the storage space 122 to write or retrieve data as desired.

The devices 100 and the controllers 124, 126 are preferably incorporated into a multi-device array (MDA). The MDA preferably uses one or more selected RAID (redundant array of independent discs) configurations to store data across the devices 100. Although only one MDA and three remote users are illustrated in FIG. 2, it will be appreciated that this is merely for purposes of illustration and is not limiting; as desired, the network system 120 can utilize any number and types of MDAs, servers, client and host devices, fabric configurations and protocols, etc.

Figure 3:
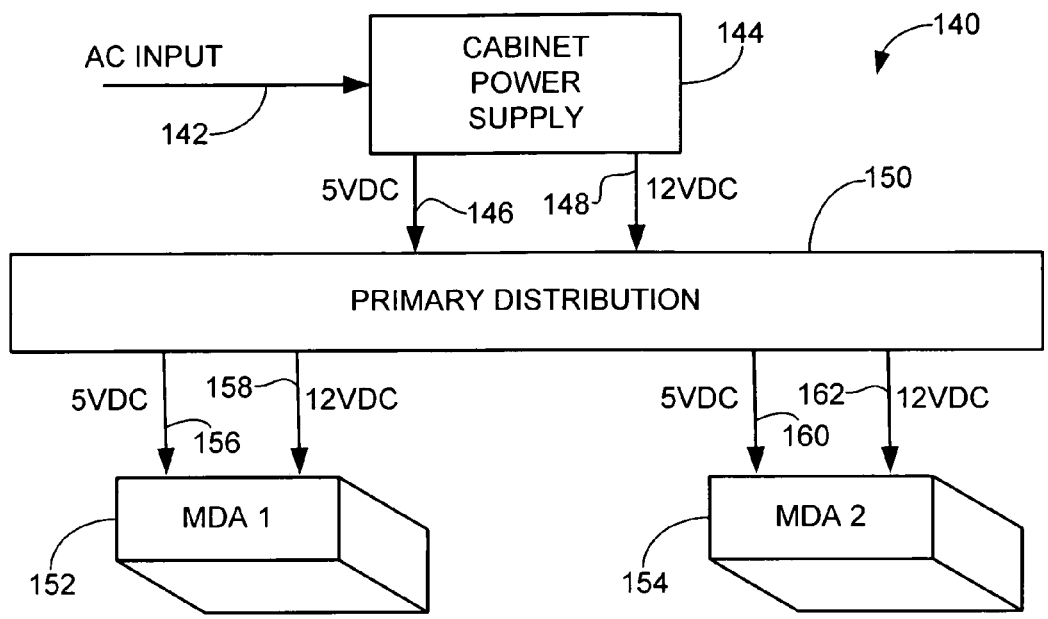
FIG. 3 illustrates a power distribution system for selected portions of the network system of FIG. 2.

FIG. 3 shows a preferred configuration for a power distribution system 140 used to supply input power and control for a number of MDAs such as shown in FIG. 2. While not limiting, it is contemplated that the system 140 is integrated into a cabinet, rack, or other suitable housing arrangement.

Input alternating current (AC) power is supplied via path 142 to a cabinet power supply 144. The input power is at a suitable line voltage, such as 240VAC. The power supply 144 applies rectification and other signal conditioning to output direct current (dc) power, such as at nominally +5 VDC and +12 VDC as shown on respective paths 146, 148.

The use of +5 and +12 voltage levels is merely for purposes of illustrating a preferred embodiment and is not limiting. Thus, other numbers of outputs and other specific voltage levels can be employed as desired. The respective voltages are preferably expressed with respect to a common reference line, such as electrical ground.

The output power on paths 146, 148 is supplied to a primary distribution module 150. The module 150 is preferably characterized as a backplane configured to support electrical and mechanical interconnection of the power supply 144, as well as a number of MDAs such as the two MDAs shown respectively at 152 and 154. The respective MDAs 152, 154 are preferably modular and configured to "plug" into the primary distribution module 150 via a suitable connector arrangement. This allows the MDAs to be installed, removed and replaced as required.

The primary distribution module 150 performs signal conditioning and regulation upon the input power supplied thereto via paths 146, 148, and provides corresponding +5 VDC and +12 VDC outputs on respective paths 156, 158 and 160, 162.

Figure 4:
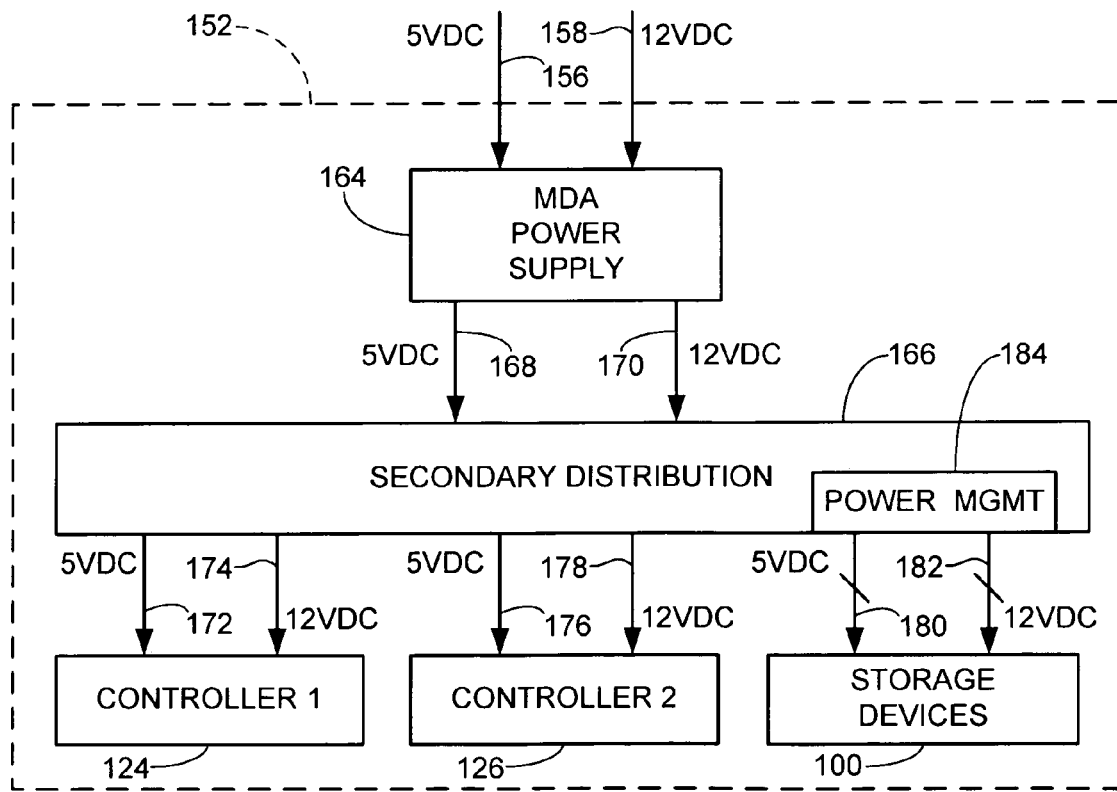
FIG. 4 shows a selected multi-device array (MDA) of FIG. 3.

FIG. 4 provides a generalized functional block diagram of a selected MDA from FIG. 3, in this case MDA 152. The input power from paths 156, 158 is provided to an MDA power supply 164. The power supply 164 applies signal conditioning and regulation on the input power, and outputs corresponding +5 and +12 source voltages to a secondary distribution module 166 via paths 168, 170.

The module 166 is preferably configured as an internal MDA backplane to facilitate electrical and mechanical interconnections of the various components of the MDA 152, including the aforementioned controllers 124, 126 and devices 100. Power is respectively supplied to these components as shown via path sets 172 and 174; 176 and 178; and 180 and 182. The MDA 152 in the present example is contemplated as accommodating a total of 10 storage devices 100 (e.g., n=10 from FIG. 2). Thus, it will be understood that the path sets 180 and 182 preferably constitute individual, separate pathways to each device 100 for each input power level.

The secondary distribution module 166 is shown in FIG. 4 to include a power management (POWER MGMT) block 184. As explained below, the block 184 preferably operates to change an input power state of each storage device 100 in a time-staggered sequence. The block 184 further preferably operates to change an input power state of at least a selected one of the plurality of storage devices 100, and preferably all of the storage devices, in accordance with a selected time-varying profile.

FIG. 5 shows the power management block 184 to preferably include a control block 186, a profile generator 188, and a switching device 190. The control block 186 preferably provides top level control in response to operational inputs from a selected controller 152, 154. The profile generator 188 generates a suitable time-varying profile when activated by the control block 186.

The switching device 190 is preferably characterized as an n-channel MOSFET with a gate input coupled to the output of the profile generator 188. The switching device 190 further has a source-drain conduction path connected between a selected input power line (represented generally by Vcc block 192) and a selected storage device 100. In the absence of a gate input, the source-drain conduction path is preferably in a high impedance state.

It will be recalled that the present example incorporates ten storage devices 100 in the MDA 152, and each device receives two (2) power inputs (+5 and +12 VDC, respectively). Thus, while FIG. 5 only shows a single profile generator/switch pair, it will be understood that the power management block 184 preferably includes a total of 20 such pairs, two of which are connected to each device 100.

Depending on the configuration, storage devices such as 100 can exhibit significant capacitive loading effects when initially coupled to an input power supply (such as 164). Accordingly, the control block 186 preferably operates to sequentially activate each of these switching devices 190 at different times using a time-staggered sequence. That is, instead of simultaneously applying the +5 and +12 VDC inputs to all of the storage devices 100, these respective input levels are sequentially applied across the devices in a selected order. This advantageously reduces transients and other dI/dt effects in the system 140.

The order in which the respective switching devices 190 are successively activated can vary depending on the requirements of a given application, and can be adapted based on empirical analysis of system performance.

In one preferred embodiment, the +5 VDC lines are activated sequentially at regular timed intervals for devices 1 to 10, followed by similar sequential activation of the +12 VDC lines for devices 1 to 10. A timer 194 can be used to trigger the sequential activation of the respective switching devices 190.

Alternatively, both +5 and +12 VDC inputs can be successively provided to the first storage device 100, after which the inputs are applied to the second device 100 and so on. In another embodiment, a pseudo-random sequence of +5 and +12 VDC activations takes place across the storage devices 100, and this sequence can further be different for each activation operation. In yet another embodiment, both input power levels are applied to each storage device 100 in turn. As each storage device 100 is activated, feedback is provided such as by a STATUS signal on path 196 to indicate that the correct voltages are present prior to activation of the next storage device 100 in the array.

It will be appreciated that such time-staggered sequencing is preferably utilized both during MDA activation, in which the storage devices 100 are powered up and brought on-line, and during MDA deactivation, in which the storage devices 100 are powered down and taken off-line. Such changes in MDA operational state are preferably initiated in response to power enable (POWER EN) signals on path 197 from the associated controller 152, 154.

As desired, the storage devices 100 can be configured to detect the presence of suitable input voltages and immediately begin self-initialization in response thereto. Alternatively, the devices can be configured to wait for receipt of a separate device enable (DEVICE EN) signal, such as on path 198 from the control block 186, prior to such self-initialization operation. In this case, the control block 186 can further operate to apply individual device enable signals to the storage devices 100 in a second time-staggered sequence after the staggered application of input power.

Self-initialization of each device 100 may include relatively large current demand requirements as the spindle motor 104 is accelerated and the VCM 112 operates to move the transducers 110 over the media surfaces. Depending on the configuration, each device 100 may provide a relatively significant current load, such as on the order of 2 A or more (for a total of 20 A or more for the entire MDA 152). Thus, time-staggering the change in power state of the devices 100 in this way can significantly reduce transients that can propagate through the system 140 and adversely affect ongoing data transfer operations with other components in the system.

The aforementioned profile generator 188 further advantageously operate to reduce system transients. The generator 188 preferably provides a time-varying input to the switching device 190 in accordance with a selected profile. In this way, the source-drain path of the n-channel MOSFET is transitioned from a substantially non-conductive state to a substantially conductive state in a controlled fashion.

In one embodiment, the profile generator 188 comprises an RC circuit such as shown by resistor 200 and capacitor 202 in FIG. 6. In another embodiment, the profile generator 188 comprises a profile table 204 which outputs a time varying sequence of digital values to a digital-to-analog converter (DAC) 206, as shown in FIG. 7.

The profile(s) in table 204 can take any suitable form, including stepped, linear, geometric, etc., so long as the profile is in fact a "profile," and not merely a conventional bi-state logic change from "off" to "on" (or "on" to "off"). Merely turning on or off the gate is not a profile, as used herein. The profiles can further be adaptively adjusted over time based on data collected during previous change of state operations.

Use of the profile generator 188 in conjunction with the time-stepped sequencing of the control block 186 is preferred, but not necessarily required. In alternative embodiments, the control block 186 can selectively bypass the profile generator 188 and provide a gate control input directly to the switching device 190.

FIG. 8 provides respective power up and power down curves 208, 210, which are plotted against a common elapsed time x-axis 212 and a common amplitude y-axis 214. The curves 208, 210 set forth a preferred manner in which the generator 188 and the switching device 190 cooperate to provide a controlled, time varying input voltage to the associated storage device 100. As will be appreciated, the curves 208, 210 are merely exemplary in nature and are not limiting.

Figure 9:
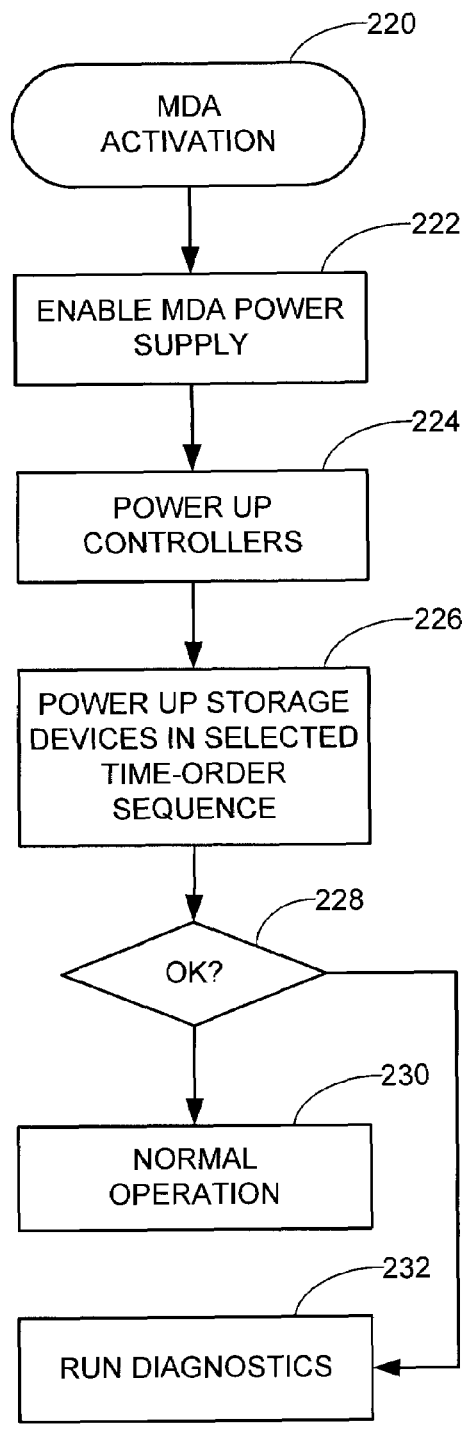
FIG. 9 is a flow chart for an MDA ACTIVATION routine, illustrative of steps carried out in accordance with preferred embodiments to activate the MDA of FIG. 4.

FIG. 9 provides a flow chart for an MDA ACTIVATION routine 220, generally illustrative of preferred steps carried out in accordance with the foregoing discussion to apply input power to storage devices 100 in an MDA.

An MDA power supply such as 164 is first preferably enabled at step 222. This may be carried out, for example, by the provision of input power from an upstream source such as on paths 156 and 158.

One or more controllers such as 152, 154 of the MDA are next powered up at step 224. This is preferably carried out via the MDA power supply 164 and the secondary distribution module 166. Preferably, remaining steps of the routine 220 are carried out under the direction of the initialized controllers.

At step 226, a plurality of storage devices in the MDA are powered up in a selected time-staggered (ordered) sequence. As discussed above, this is preferably carried out by the power management block 184 which sequentially activates the respective switching devices 190 one after another. As desired, input profiling is provided to the switching devices via profile generators 188. Moreover, as desired different profiles are used for different ones of the nominally identical devices 100 during the staggered power-up sequence.

Decision step 228 inquires as to whether the storage devices 100 have been successfully initialized; if so, the MDA proceeds with normal operation at step 230. If not, diagnostic routines may be run such as represented at step 232 to address the situation and implement appropriate corrective actions.

Figure 10:
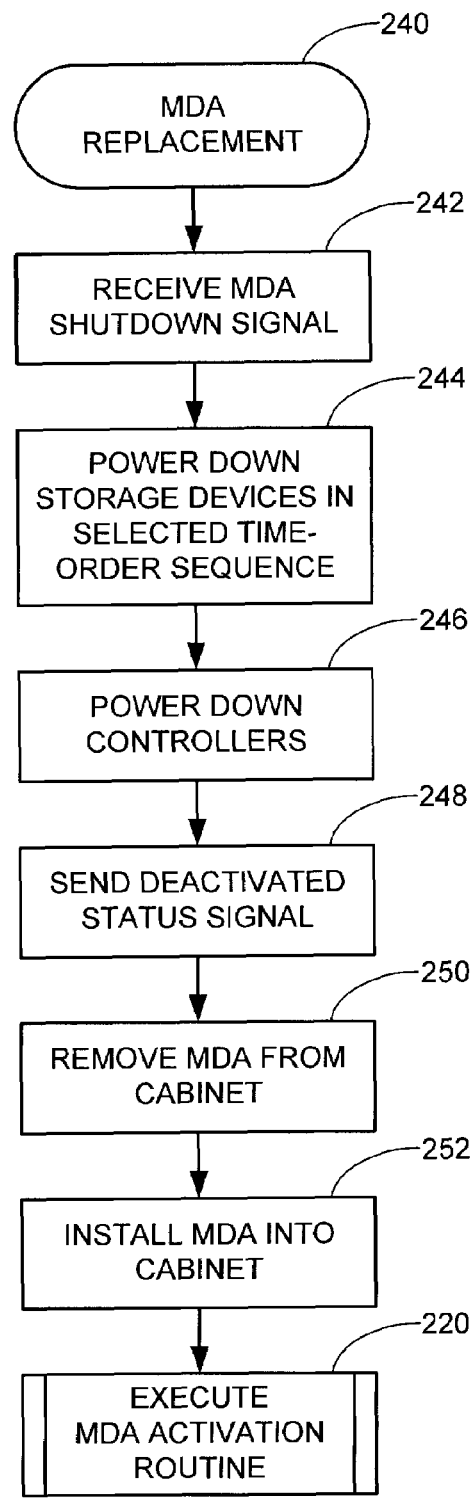
FIG. 10 is a flow chart for an MDA REPLACEMENT routine, illustrative of steps carried out in accordance with preferred embodiments to remove and replace the MDA of FIG. 4.

An MDA REPLACEMENT routine 240 is set forth by FIG. 10, generally representative of steps carried out to remove and replace a selected MDA from the system.

As shown at step 242, an MDA shutdown signal is first provided. This signal is contemplated as being generated in response to some higher order routine which has identified and initiated the MDA replacement operation. In response, the storage devices are powered down in a selected time-order sequence at step 244. This is preferably carried out by the control block 186 as discussed above. As before, the profile generators 188 can be advantageously used to further control the disconnection of each of the input power paths to the system 140.

Once the storage devices 100 are determined to be deactivated, the routine continues to step 246 wherein the controllers are similarly powered down. Although the preferred embodiments presented above do not specifically utilize the power management 184 to control the activation state of the controllers 124, 126, it will be appreciated that such circuitry can also be used to activate the controllers as desired.

An optional deactivated status signal can be generated and transmitted at step 248 to confirm that the MDA 152 has been successfully powered down. This can be carried out in a number of ways, including through an attempt by the host server 128 to communicate with the deactivated MDA.

Once the MDA is confirmed as being shut down, the MDA is removed from the cabinet at step 250. Preferably, this includes physical manipulation of the MDA to disconnect it from the primary distribution module 150 and to slide it out of the cabinet or associated housing.

A replacement MDA is next installed onto the primary distribution module 150 at step 252, and the MDA ACTIVATION routine 220 of FIG. 9 is performed upon the new replacement MDA.

Depending on the configuration of the MDA, the assembly may be of substantial weight (e.g., 30-40 pounds or more). Since the MDA incorporates a significant number of rotating masses during operation (e.g., spindle motors, media, etc.), attempting to physically remove an MDA while the MDA is in a fully operational state can result in unexpected and undesired rotational forces. Thus, the routine of FIG. 10 advantageously reduces a likelihood of damage to the MDA or injury to personnel by controllably placing the MDA in a deactivated state prior to removal.

While the foregoing discussion has primarily focused upon the capabilities of the power management circuit 184 to sequentially change the input power state of all of the devices in an MDA, in further preferred embodiments the circuit 184 is configured to selectively alter the input power state of a single, individual device 100 in the MDA.

This can be advantageous, for example, to conserve overall power consumption by turning off one or more devices 100 that are not currently in use. Spare devices 100 within the array, or devices that are not necessary to implement a particular RAID configuration based on current usage requirements, can fall within this category.

From time to time, individual devices 100 may also be identified for replacement such as for routine maintenance efforts or because of abnormal operational characteristics (disc failures, over temperature conditions, etc.).

Figure 11:
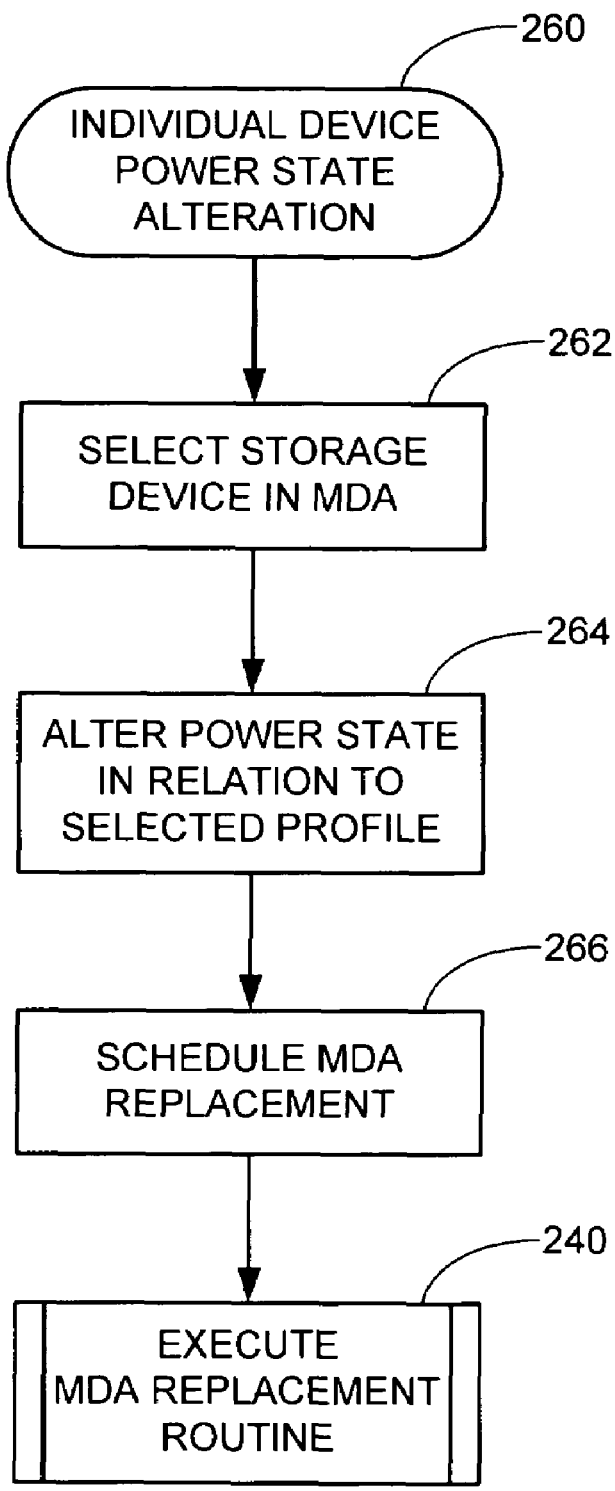
FIG. 11 is a flow chart for an INDIVIDUAL DEVICE POWER STATE ALTERATION routine, illustrative of steps carried out in accordance with preferred embodiments to selectively alter an activation state of an individual storage device in the MDA of FIG. 4.

FIG. 11 thus sets forth an INDIVIDUAL DEVICE POWER STATE ALTERATION routine 260, representative of preferred steps carried out in accordance with preferred embodiments to alter the power state of a particular device (e.g., power up from a deactivated state, power down from an activated state).

At step 262, a selected storage device 100 is identified for which the input power state is to be altered. As indicated above, this can result from operational loading requirements of the system, the detection of a failure condition for the device, etc. This information is preferably communicated to the control block 186.

At step 264, the input power to the selected device is altered from a first state to a second state in accordance with a selected time-varying profile. This is preferably carried out by the profile generator 188 in conjunction with the switching device 190 for each power level associated with the device 100 (e.g., +5 VDC and +12 VDC, respectively). This serves to either power up or power down the selected device, depending on the requirements of step 262.

If the device 100 is shut down due to a failure or maintenance operation so that the device 100 is to be subsequently replaced, the routine continues to step 266 where a replacement of the MDA 152 can be scheduled. The routine then proceeds to carry out the MDA REPLACEMENT routine 240 of FIG. 10, with an additional step of replacing the failed device 100 in the MDA prior to replacement.

While preferred embodiments presented herein have been directed to a multi-device array utilizing a plurality of disc drive storage devices, it will be appreciated that such is merely for purposes of illustration and is not limiting. Rather, the claimed invention can be utilized in any number of various environments to promote data integrity.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application without departing from the spirit and scope of the present invention.

What is claimed is:

1. A method comprising:
sequentially applying an input supply voltage to each of a plurality of storage devices in turn in a first time-staggered sequence; and then
forwarding a storage device enable signal to each of the storage devices in turn in a second time-staggered sequence different from the first sequence, wherein responsive to receipt of said storage device enable signal the associated storage device draws a magnitude of current that is greater than an amount of current drawn during the sequentially applying step.

2. The method of claim 1, wherein prior to the forwarding step, a status signal is provided by each of the plurality of storage devices in turn to indicate that the input supply voltage has been received by each said device.

3. The method of claim 1, wherein upon receipt of said storage device enable signal the associated storage device initiates rotation of a rotatable storage medium from rest to an operational velocity.

4. The method of claim 1, wherein the plurality of storage devices store data in accordance with a selected RAID configuration.

5. The method of claim 1, wherein a power supply is configured to supply respective first and second direct current (dc) voltages to each of the plurality of storage devices, and wherein the sequentially applying step comprises connecting said voltages to the storage devices in a selected sequential order corresponding to the first time-staggered sequence.

6. The method of claim 1, wherein a switching device is connected to each of the storage devices, and wherein the sequentially applying step comprises altering a gate voltage of the switching device associated with each storage device in turn in accordance with a selected time-varying profile to transition a source-drain conductivity of the switching device from a non-conductive state to a conductive state.

7. The method of claim 6, wherein said gate voltage is altered by coupling a resistor and a capacitor to the switching device to form an RC network, and applying a voltage to the RC network to increase said gate voltage.

8. The method of claim 6, wherein said gate voltage is altered by applying a sequence of table values from a profile table to a digital to analog converter (DAC), wherein an output of the DAC is coupled to a gate of the switching device.

9. An apparatus comprising:
a multi-device array with a plurality of storage devices; and
a circuit which changes an input power state of each said storage device in a time-staggered sequence to transition the array between an operationally deactivated state and an operationally activated state, the circuit comprising:
a plurality of switching devices, each switching device connected between an associated storage device and a power supply; and
a profile generator which applies a time-varying gate voltage profile to each of the switching devices in the time-staggered sequence in turn to transition the associated switching device from a selected conductive or non-conductive state to a remaining non-conductive or conductive state.

10. The apparatus of claim 9, wherein the circuit changes the input power state to transition the array from the operationally deactivated state to the operationally activated state.

11. The apparatus of claim 9, wherein the circuit changes the input power state to transition the array from the operationally activated state to the operationally deactivated.

12. The apparatus of claim 9, wherein the multi-device array further comprises a controller which stores data across the plurality of storage devices in accordance with a selected RAID configuration while the array is in the operationally activated state.

13. The apparatus of claim 9, wherein the multi-device array further comprises a power supply which provides respective first and second direct current (dc) voltages to each of the plurality of storage devices, and wherein the circuit connects said voltages to said storage devices in a selected sequential order.

14. The apparatus of claim 9, wherein the profile generator comprises a resistor and a capacitor arranged to form an RC network coupled to a gate of a selected switching device, the RC network defining said time-varying gate voltage profile.

15. The apparatus of claim 9, wherein the profile generator comprises a table of profile values and a digital to analog converter (DAC) coupled to a gate of a selected switching device, wherein the time-varying gate voltage profile is applied to said gate by the DAC responsive to the table of profile values.

16. An apparatus comprising:
a multi-device array with a plurality of storage devices;
a power supply; and
a power control circuit configured to sequentially apply an input supply voltage from the power supply to each of the storage devices in turn in a first time-staggered sequence, and then to forward a storage device enable signal to each of the storage devices in turn in a different, second time-staggered sequence, wherein each storage device, upon receipt of said storage device enable signal, initiates rotation of a storage medium from rest to an operational velocity using the applied input supply voltage.

17. The apparatus of claim 16, wherein the power control circuit comprises a control block, a profile generator and a plurality of switching devices, wherein during the first time-staggered sequence, for each of the storage devices in turn the profile generator applies a selected time-varying profile to a gate of the switching device associated with said each storage device to alter a source-drain conductivity of the switching device.

18. The apparatus of claim 17, wherein the profile generator comprises a resistor and a capacitor arranged to form an RC network coupled to a gate of a selected switching device, the RC network defining said time-varying gate voltage profile.

19. The apparatus of claim 17, wherein the profile generator comprises a table of profile values and a digital to analog converter (DAC) coupled to a gate of a selected switching device, wherein the time-varying gate voltage profile is aplied to said gate by the DAC responsive to the table of profile values.

20. The apparatus of claim 16, wherein the power supply provides respective first and second direct current (dc) voltages to each of the plurality of storage devices, and wherein the power control circuit is configured to connect said voltages to said storage devices in the first time-staggered sequence.

* * * * *

UNITED STATES PATENT AND TRADEMARK OFFICE
CERTIFICATE OF CORRECTION

PATENT NO.        : 7,661,005 B2                                     Page 1 of 1
APPLICATION NO. : 11/479364
DATED             : February 9, 2010
INVENTOR(S)       : Spengler et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 677 days.

Signed and Sealed this

Thirtieth Day of November, 2010

David J. Kappos
*Director of the United States Patent and Trademark Office*